United States Patent
Taemmerich

(10) Patent No.: US 7,243,472 B2
(45) Date of Patent: Jul. 17, 2007

(54) DECORATIVE TRIM PIECE

(75) Inventor: Rolf Taemmerich, Lindenberg/Allg. (DE)

(73) Assignee: Angell-Demmel Europe GmbH, Lindau/B. (DE)

( * ) Notice: Subject to any disclaimer, the term of this patent is extended or adjusted under 35 U.S.C. 154(b) by 150 days.

(21) Appl. No.: 10/458,739

(22) Filed: Jun. 11, 2003

(65) Prior Publication Data

US 2004/0250499 A1 Dec. 16, 2004

(51) Int. Cl.
*E04C 2/38* (2006.01)

(52) U.S. Cl. .................. 52/716.6; 52/716.5; 52/717.01; 52/718.04; 52/717.04; 52/309.1; 296/70; 296/1.08; 428/31

(58) Field of Classification Search .................. 296/70, 296/1.08; 52/716.5–716.6, 309.1, 309.7–309.8, 52/309.14, 716.8, 717.01, 718.04, 717.04; 428/31, 99, 195, 192, 164, 121, 124, 172, 428/487, 130, 60; 293/128
See application file for complete search history.

(56) References Cited

U.S. PATENT DOCUMENTS

| | | | | | |
|---|---|---|---|---|---|
| 5,350,608 | A | * | 9/1994 | Zoller | 428/31 |
| 5,537,300 | A | * | 7/1996 | Kraines et al. | 362/86 |
| 5,552,195 | A | * | 9/1996 | Cook et al. | 428/31 |
| 5,562,797 | A | * | 10/1996 | Phelps | 156/510 |
| 5,564,249 | A | * | 10/1996 | Borys et al. | 52/716.5 |
| 5,718,326 | A | * | 2/1998 | Larose et al. | 200/314 |
| 5,727,866 | A | * | 3/1998 | Kraines et al. | 362/86 |
| 5,965,222 | A | | 10/1999 | Benzing et al. | |
| 6,054,207 | A | * | 4/2000 | Finley | 428/317.9 |
| 6,328,367 | B1 | * | 12/2001 | Eichhorn et al. | 296/70 |

FOREIGN PATENT DOCUMENTS

| | | |
|---|---|---|
| DE | 1 729 168 | 9/1971 |
| DE | 2444267 A1 | 4/1975 |
| DE | 8614011 U1 | 10/1986 |
| DE | 19546551 C1 | 1/1997 |
| DE | 29602835 U1 | 1/1997 |
| DE | 29808949 U1 | 9/1998 |
| DE | 29912270 U1 | 2/2001 |
| DE | 19914092 C2 | 10/2001 |
| FR | 2 244 618 | 4/1975 |
| JP | 63095913 | 4/1988 |

* cited by examiner

*Primary Examiner*—Jeanette Chapman
(74) *Attorney, Agent, or Firm*—Browdy and Neimark, PLLC

(57) ABSTRACT

The present invention is concerned with a decorative trim piece consisting substantially of a carrying element of plastic and a decorative plate of thin metal fastened thereon, to decorate the interior, in land vehicles, aircraft or watercraft, predominantly for use as dashboard elements, center console or as door trim strips. The decorative trim piece is characterized in that the completely finished decorative plate is inserted into an injection mold and that the carrying element is injection-molded as an injection molding compound directly onto the back of the decorative plate so that both elements are connected to one another at least in partial areas so solidly that they form a sturdy unit.

15 Claims, 3 Drawing Sheets

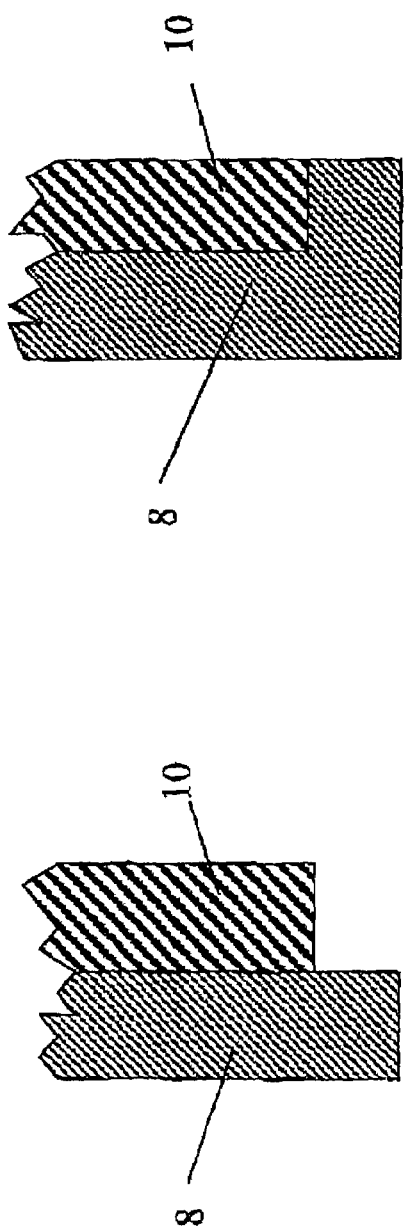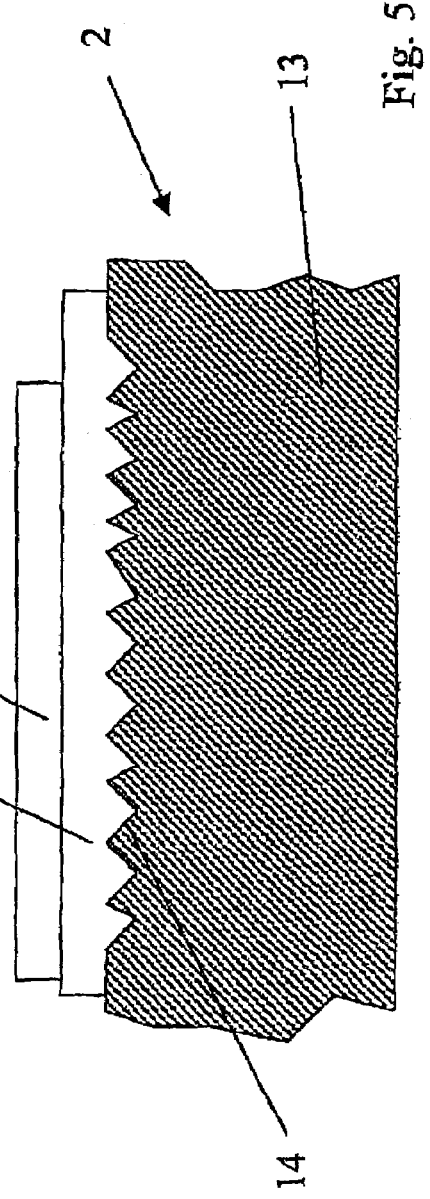

DECORATIVE TRIM PIECE

The present invention is concerned with a decorative trim piece according to the preamble of claim 1. Decorative trim pieces of this type are used predominantly in land vehicles, aircraft or watercraft. They serve to decorate the interior, especially as dashboard elements, center console, or as door trim strips.

It has been known until now to use an at least two-piece trim piece wherein the decorative face plate was composed of metal, which was carried by a carrying element composed of plastic.

The decorative plate of metal was principally an aluminum sheet with a thickness of more than 0.3 mm. Sheet metal of this thickness has the advantage that the face of the sheet metal can be provided with appropriate decorations and surfaces. It is known, for example, to brush a surface of this type, provide it with a transparent coating lacquer, design it with appropriate imprint surfaces, and suchlike.

Until now, however, this decorative plate was fastened to the carrying element of plastic only as a so-called crimped or flanged piece. To achieve this, it was known to place the decorative plate with projecting edges onto the carrying element located underneath and then flange or crimp the edges of the decorative plate such that the decorative plate was attached to the supporting plastic.

It is a shortcoming of this known fastening method, however, that the crimping process takes a relatively long time, requires high-precision tools, and thus represents a relatively expensive assembly method.

The costs associated with a trim piece produced by this method are accordingly high as well.

The invention, therefore, has as its object to improve a trim piece of the above type consisting of at least two parts in such a way that it can be manufactured significantly more easily and cost effectively.

To meet this object, the invention is characterized in that the decorative plate, which is composed of metal and completely finished, is inserted into an injection mold and that the carrying element is injection-molded as an injection molding compound directly onto the back of the decorative plate, so that both are connected to one another at least in partial areas so solidly that they form a sturdy, finished unit.

With the given technical teaching, this now results in the significant advantage that the above-mentioned complex assembly process between the decorative plate and plastic carrying element is eliminated. According to the invention, the completely finished decorative plate is now placed directly into the plastic injection mold and the plastic compound is injection-molded onto it from behind, so that, when the part is taken out, the carrying element of plastic is now connected solidly and non-detachably to the decorative plate of metal.

It is important with this type of manufacture that a good adhesion is created during the injection molding process between the carrying element and the metal decorative plate. This is because, for reasons of cost effectiveness, the appropriate placement of snap-in knobs, projections, etc. on the back of the decorative plate is dispensed with, as this would result in increased manufacturing costs. For this reason the back of the decorative plate is completely smooth and level and must, therefore, accommodate the carrying element of plastic and enter into a solid adhesion with same.

For this purpose, provision is made in a first embodiment of the invention for the plastic carrying element to be injection-molded to the back of the decorative plate and, with outward facing legs, hook around the respective corresponding leg of the decorative plate from underneath.

In this manner the decorative plate is carried and hooked around from underneath on all sides, so-to speak, by the plastic carrying element.

In the current embodiment the decorative plate consists essentially of an element that is U-shaped in cross section. However, the invention is not limited to this. The decorative plate may be any, also spherical and three-dimensionally shaped aluminum sheet, to which the inventive plastic carrying element is injection-molded from behind. Also, the plastic carrying element can be not only a rectangular object, but it may carry any desired receptacles, core elements, location holes and projections, so that, after this combination element has been removed from the injection mold, the decorative element is already fully completed. There is no need for any post-processing and this is a significant advantage compared to the prior art.

It has already been pointed out at the beginning that a relatively thick aluminum sheet of a thickness of, for example, more than 0.3 mm is used. This has the advantage that an aluminum part of this type is now already completely finished. This means that the surface of this decorative plate has a ribbing or brushing, for example, that this surface is then sealed, for example, with a transparent lacquer and that a printer's color has then been applied to the surface, e.g., by screen printing.

The decorative plate thus does not require any post processing. This is the essential difference to the prior art, in which it was also known to join thin aluminum films to plastic carrying elements of the above type.

After the removal of decorative elements of this type that were produced with thin aluminum films, the aluminum films then had to be finished in an expensive fashion. This is eliminated according to the present invention.

In an improvement of the invention, provision is made for punch-outs or recesses to be provided in the surface of the decorative plates, through which the plastic material of the carrying element takes hold. In this manner additional visual elements are created in the decorative plate, which determine the visual impression of the trim piece. Visual elements of this type may be indicating elements, for example, or function elements, or also push-buttons, switching elements and suchlike. The plastic material may, of course, also be designed transparent, thus creating the option to illuminate the indicating and function elements from behind.

Providing the punch-outs in the surface of the decorative plate thus creates the added significant advantage that the plastic material enters into the decorative plate and an even better adhesion takes place in these locations.

The subject matter of the present invention results not only from the subject matter of the individual claims but also from the combination of individual claims with one another. All information and characteristics revealed in the documentation, including in the abstract, particularly the dimensional formation shown in the drawings, are claimed as essential for the invention to the extent in which they are novel compared to the prior art, either individually or in combination.

The invention will be explained in more detail below based on drawings showing a number of methods of execution. Additional characteristics and advantages of the invention that are essential for the invention will become apparent from the drawings and their description.

In the drawings:

FIG. 3 shows an embodiment of the side legs that is varied from FIG. 2,

FIG. 4 shows an embodiment of the side legs that is varied form FIG. 3,

FIG. 5 shows an enlarged section through the decorative plate (without carrying element).

FIG. 1 shows a general depiction of a trim piece 1 consisting, in its most simple embodiment, of a two-piece element.

The upper part is formed by a metal decorative plate 2. This decorative plate is preferably an aluminum sheet of a thickness of more than 0.3 mm. However, any other sheet metal may be used as well, such as steel sheet, special steel sheet, nickel steel sheet, and suchlike.

In the most simple embodiment, the surface of the decorative plate 2 does not incorporate any perforations. It is formed completely flat and continuous and has, for example, a surface construction as it will be explained in more detail based on FIG. 5.

In a modified embodiment, provision may be made, however, for the decorative plate 2 to have perforations, so that indicating elements 4 or function elements 5 (e.g., push buttons or switches) may be provided there, or also decorative elements 3 with an appropriate lettering or imprint, or suchlike.

Figure 1:
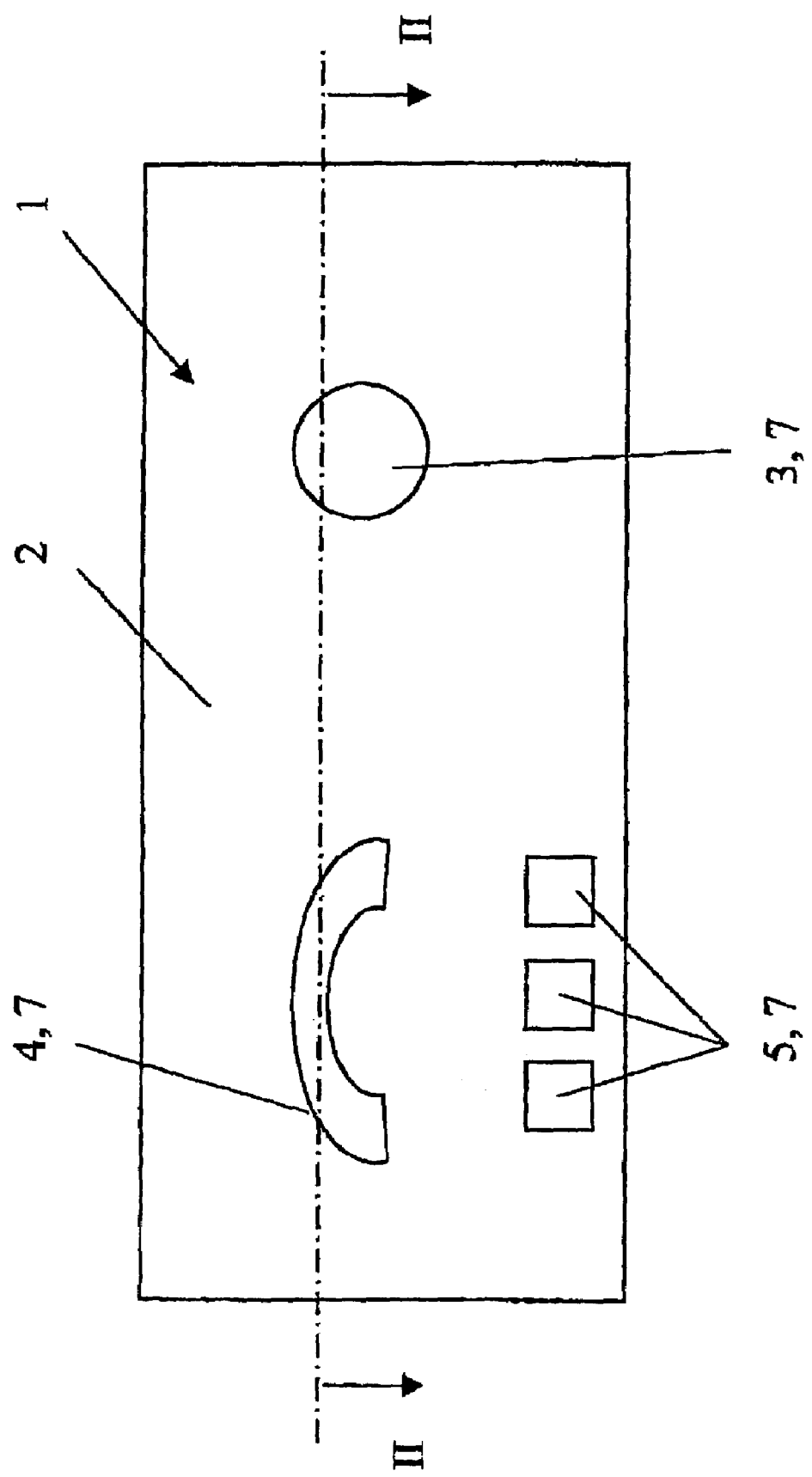
FIG. 1 shows a top view of the trim piece.
Figure 2:
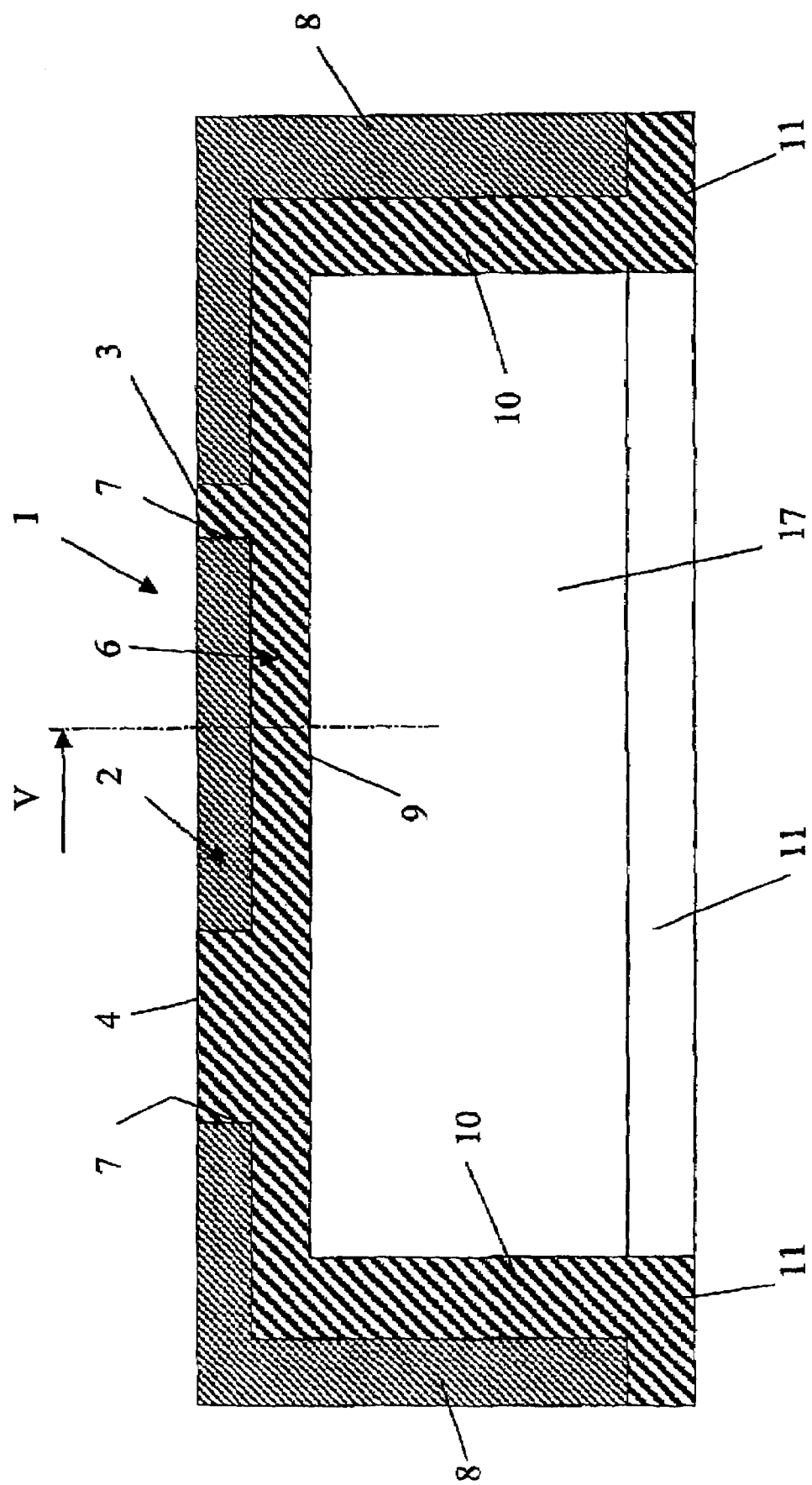
FIG. 2 shows a section through the trim piece along the line II—II in FIG. 1.

This second embodiment is shown in a section in FIG. 2.

It is important that the decorative plate 2 has side legs 8 that are bent away from its straight front plate, so that the decorative plate 2 has an approximately U-shaped profile.

As mentioned in the introductory part of the specification, the invention is not limited to the execution of the decorative plate 2 from a U-shaped profile, however, any desired—even three-dimensionally shaped—profile may be used. It is important that the completely finished decorative plate 2, as it is shown in the enlarged section according to FIG. 5, is now placed in its entirety into the mold recess of an injection mold and a carrying element 6 of plastic is now injection-molded onto it from behind.

In the shown embodiment, the plastic material of the carrying element 6 thus also penetrates through the recesses 7 in the decorative plate 2 and also settles along the edge regions of these recesses 7 in the decorative plate 2. This produces an even better adhesion.

Additionally, it is essential with this embodiment that the upper carrying plate 9 of the carrying element 6 also has integral side legs 10, which come to rest in a form-fitting manner against the side legs 8 of the decorative plate 2.

In this embodiment provision is additionally made for the side legs 10 to have outward facing projections 11 that hook around the side legs 8 of the decorative plate 2 from underneath along the entire circumference and thus also produce a face-end adhesion to the decorative plate 2.

It is not shown, incidentally, that various other function elements may also be disposed in the interior of the carrying element 6, which are also connected as integral same-material elements to the carrying element 6. They are the appropriate assembly projections, round fastening elements that serve to snap on the decorative element 1 onto corresponding fastening surfaces, and suchlike.

Provision may additionally also be made for the plastic material of the carrying element 6 to be composed of a transparent material and for the interior 17 to have lighting elements disposed in it, which may be connected, for example, in a light conducting manner to the carrying element 6. In this embodiment a corresponding light effect on the display side of the decorative plate 2 would then be attained in the region of the indicating elements 4 or function elements 5.

FIGS. 3 and 4 show variations of the side-leg formation in comparison to FIG. 2.

FIG. 3 shows that the side leg 10 of the carrying element 6 may also end before it reaches the face end of the side leg 8 of the decorative plate 2.

FIG. 4 also shows that the side legs 8 of the decorative plate 2 also may be provided with an appropriate radially outward facing projection so that the same hooks around the side legs 10 of the carrying element 6 from underneath.

FIG. 5 shows a significantly enlarged rendering of the surface of the decorative plate 2.

It is visible that a brushing 14 is disposed in the full material 13 of the decorative plate 2 on its surface. In lieu of this brushing, other surface effects can be achieved as well, e.g., the placement of knobs, ribbings, sand blasting patterns, and suchlike.

To attain a surface protection, provision is further made for this surface covering, for example with the brushing 14, to be covered by a layer of transparent coating lacquer 15.

On the surface of this layer of coating lacquer 15 a texture imprint 16 may be applied. This texture imprint may be present only in certain areas.

It is important that the element of a decorative plate that is completely finished in this fashion and does not require any post-processing, is now placed in this form into the plastic injection mold and the carrying element 6 of plastic is injection-molded onto it from behind. In this manner the manufacturing costs are lowered by approximately 20% compared to the production described at the beginning.

The complex flanging of the edges of a decorative plate composed of aluminum sheet around the carrying element 6 is no longer necessary.

Drawing Legend

1 Trim Piece
2 Decorative Plate (of Metal)
3 Decorative Elements
4 Indicating Element
5 Function Element
6 Carrying Element
7 Recess
8 Side Leg
9 Carrying Plate
10 Side Leg
11 Projection
12 Projection
13 Full Material
14 Brushing
15 Layer of Coating Lacquer
16 Texture Imprint
17 Interior

What is claimed is:

1. A decorative trim piece including a carrying element of plastic and a decorative plate of thin metal fastened thereon, to decorate the interior, in land vehicles, aircraft or watercraft, predominantly for use as dashboard elements, center console or as door trim strips, characterized in that the thin metal decorative plate (2) is united with the carrying element (6), an injection molding compound being injection molded within an injection mold directly onto the back of the decorative plate (2), so that both elements are connected to one another at least in partial areas so solidly that they form a sturdy, finished unit, wherein punch-outs or recesses (7) are formed in the surface of the decorative plate (2), through which the plastic material of the carrying element (6) takes hold;

the injection molded plastic carrying element (6) having side legs (10);

the injection molded plastic carrying element (6) having an upper carrying plate (9), the side legs (10) being integral with the upper carrying plate (9), and the side legs (10) resting in a form-fitting manner against corresponding legs (8) of the decorative metal plate (2); and wherein the side legs (10) have outwardly facing projections (11) which hook under respective corresponding legs (8) of the decorative metal plate (2) from underneath along the entire circumference thereof, thereby providing a face-end adhesion to the decorative plate.

2. A decorative trim piece according to claim 1, characterized in that no snap-on knobs, projections are disposed on the back of the decorative plate (2).

3. A decorative trim piece according to claim 1 or 2, characterized in that the back of the decorative plate (2) is completely smooth and flat.

4. A decorative trim piece according to claim 1, characterized in that the decorative plate (2) has a substantially U-shaped cross section.

5. A decorative element according to claim 1, characterized in that the plastic material of the carrying element (6) is composed of a transparent material.

6. A decorative trim piece according to claim 1, characterized in that a transparent plastic material (18) is used in the region of the recesses (7, 17) to provide for the option of illuminating the decorative elements, indicating and function elements (3, 4) that are visible in the decorative plate from the display side.

7. A decorative trim piece according to claim 1, characterized in that lighting elements are disposed in the interior (17) of the carrying element (6), which are connected to the carrying element (6) in a light-conducting manner.

8. A decorative trim piece according to claim 1, characterized in that the plastic elements that takes hold through the recesses (7) of the decorative plate (2) are decorative elements (3) and/or indicating elements (4), function elements, push buttons, or switch elements.

9. A decorative trim piece according to claim 1, characterized in that the surface of the decorative plate (2) is covered by a transparent layer of coating lacquer (15).

10. A decorative element according to claim 1, characterized in that a textured imprint (16) is provided on at least part of the surface of the layer of coating lacquer (15).

11. A decorative trim piece according to claim 4, characterized in that the decorative plate (2) has a substantially U-shaped cross section.

12. A decorative element according to claim 11, characterized in that the plastic material of the carrying element (6) is composed of a transparent material.

13. A decorative trim piece according to claim 12, characterized in that a transparent plastic material (18) is used in the region of the recesses (7, 17) to provide for the option of illuminating the decorative elements, indicating and function elements (3, 4) that are visible in the decorative plate from the display side.

14. A decorative trim piece according to claim 13, characterized in that lighting elements are disposed in the interior (17) of the carrying element (6), which are connected to the carrying element (6) in a light-conducting manner.

15. A decorative trim piece according to claim 14, characterized in that the plastic elements that takes hold through the recesses (7) of the decorative plate (2) are decorative elements (3) and/or indicating elements (4), function elements, push buttons, or switch elements.

\* \* \* \* \*